(12) United States Patent
Takeyasu et al.

(10) Patent No.: US 9,798,424 B2
(45) Date of Patent: Oct. 24, 2017

(54) TRANSPARENT CONDUCTIVE FILM

(71) Applicant: NITTO DENKO CORPORATION, Ibaraki-shi, Osaka (JP)

(72) Inventors: Tomohiro Takeyasu, Ibaraki (JP); Yusuke Yamamoto, Ibaraki (JP); Minoru Kanatani, Ibaraki (JP); Kazuaki Sasa, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 777 days.

(21) Appl. No.: 14/055,251

(22) Filed: Oct. 16, 2013

(65) Prior Publication Data

US 2014/0141237 A1 May 22, 2014

(30) Foreign Application Priority Data

Nov. 22, 2012 (JP) .................................. 2012-256148

(51) Int. Cl.
*G06F 3/044* (2006.01)
*H01B 1/08* (2006.01)

(52) U.S. Cl.
CPC .............. *G06F 3/044* (2013.01); *H01B 1/08* (2013.01); *Y10T 428/265* (2015.01)

(58) Field of Classification Search
None
See application file for complete search history.

(56) References Cited

U.S. PATENT DOCUMENTS

| 4,345,000 | A | 8/1982 | Kawazoe et al. |
| 2002/0002992 | A1 | 1/2002 | Kariya et al. |
| 2007/0091074 | A1 | 4/2007 | Nashiki et al. |
| 2011/0177314 | A1 | 7/2011 | Tatami et al. |
| 2012/0111718 | A1 | 5/2012 | Haishi et al. |

FOREIGN PATENT DOCUMENTS

| CN | 101127254 A | 2/2008 |
| CN | 102165535 A | 8/2011 |
| CN | 102543301 A | 7/2012 |
| EP | 2 450 468 A1 | 5/2012 |
| JP | 56-86408 A | 7/1981 |
| JP | 6-28932 A | 2/1994 |
| JP | 2000-38654 A | 2/2000 |
| JP | 2000-82831 A | 3/2000 |
| JP | 2002367436 A | * 12/2002 |

(Continued)

OTHER PUBLICATIONS

Machine translation JP2011-103289 (2011).*

(Continued)

*Primary Examiner* — Alexandre Ferre
(74) *Attorney, Agent, or Firm* — Westerman, Hattori, Daniels & Adrian, LLP

(57) ABSTRACT

A transparent conductive film includes a film base, and a polycrystalline layer of indium tin oxide formed on the film base. The polycrystalline layer has a gradient of a concentration of tin oxide in a thickness direction thereof. A maximum value of the concentration of tin oxide in the thickness direction of the polycrystalline layer is 6 wt % to 12 wt %. The polycrystalline layer has a thickness of 10 nm to 35 nm. An average value of maximum sizes of crystal grains composing the polycrystalline layer is 380 nm to 730 nm.

6 Claims, 5 Drawing Sheets

(56) References Cited

FOREIGN PATENT DOCUMENTS

| JP | 2004031624 A | * | 1/2004 |
|---|---|---|---|
| JP | 2010-80290 A | | 4/2010 |
| JP | 2010-080290 A | | 4/2010 |
| JP | 2011-3446 A | | 1/2011 |
| JP | 2011-103289 A | | 5/2011 |
| TW | 201015590 A1 | | 4/2010 |
| WO | 2011/046094 A1 | | 4/2011 |

OTHER PUBLICATIONS

Machine translation JP2004-31624 (2004).*
Machine translation JP2002-367360 (2002).*
Japanese Office Action dated Jun. 2, 2014, issued in Japanese Patent Application No. 2012-256148, w/English translation (7 pages).
Decision to Grant a Patent mailed Sep. 8, 2014, issued in corresponding Japanese Patent Application No. 2012-256148, with English Translation (6 pages).
Taiwanese Approval Decision Letter dated Dec. 27, 2014, issued in corresponding TW Application No. 102136221 with English partial translation (7 pages).
Decision for Grant of Patent dated Dec. 31, 2014, issued in corresponding Korean Patent Application No. 10-2013-0134749, with English translation (3 pages).
Office Action dated Aug. 20, 2015, issued in counterpart Chinese Patent Application No. 201310597960.6 w/English translation (16 pages).
Extended European Search Report dated Feb. 25, 2014, issued in corresponding European Patent Application No. 13193846.6 (5 pages).

* cited by examiner

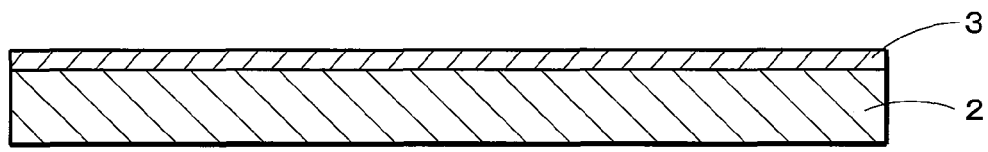
F I G. 1
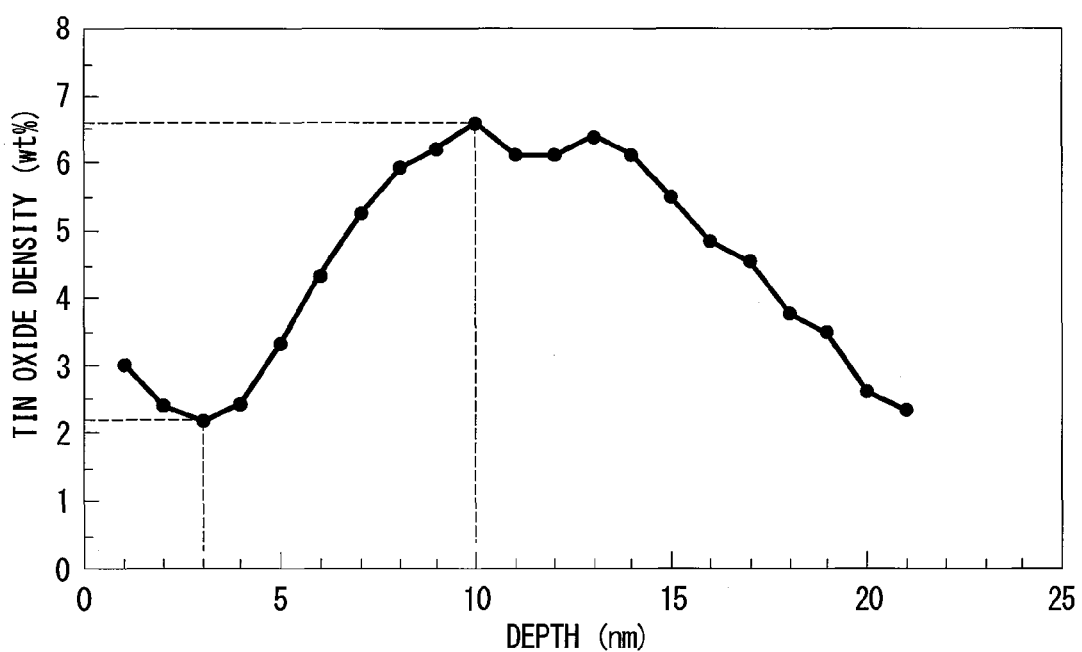
F I G. 2

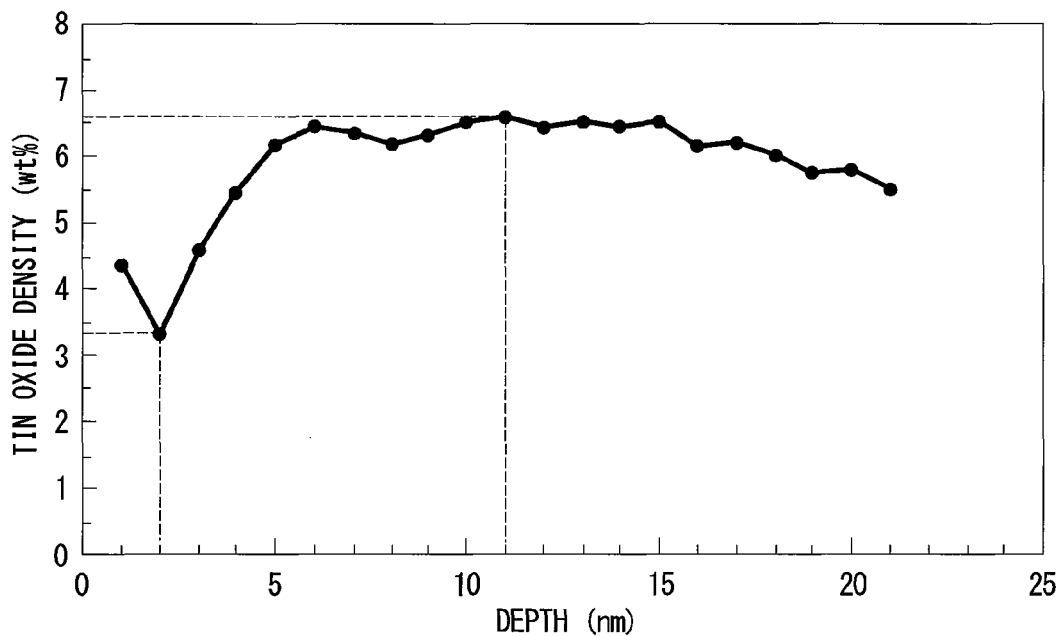
F I G. 3
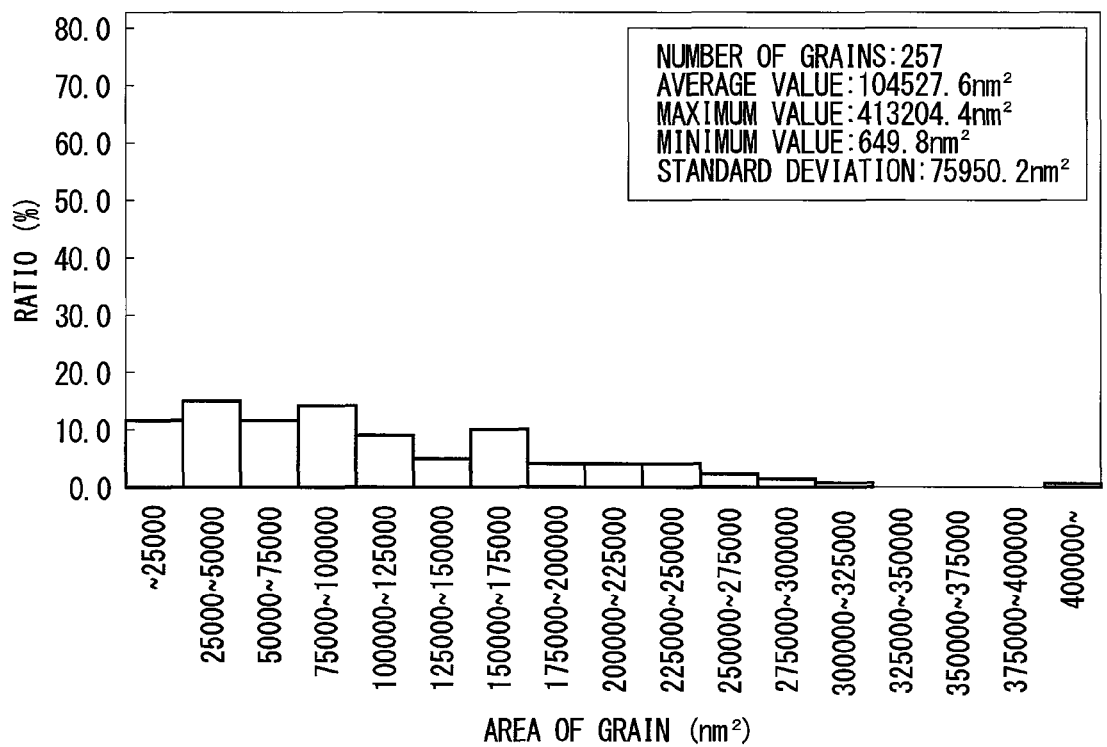
F I G. 6

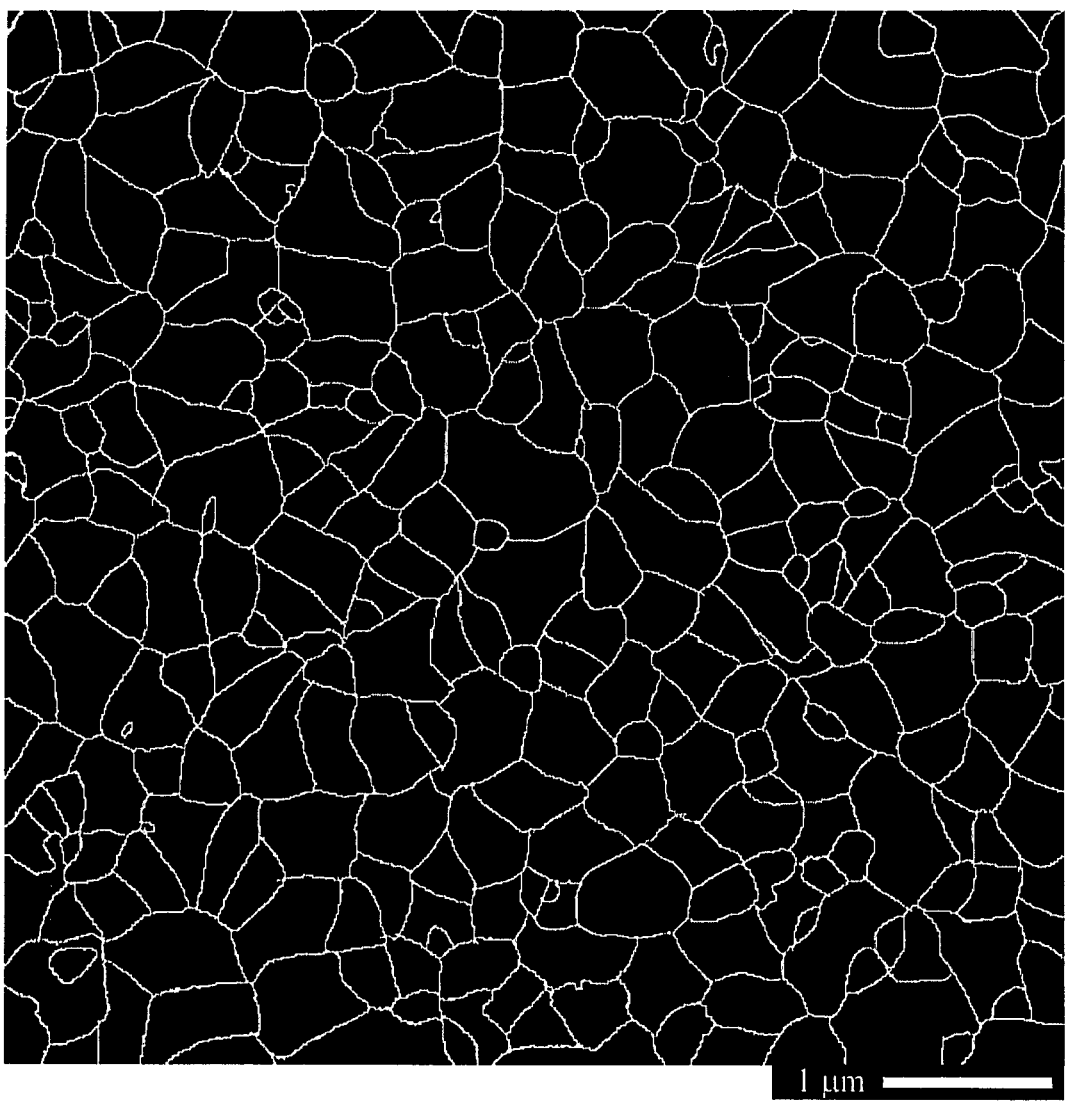
F I G. 5

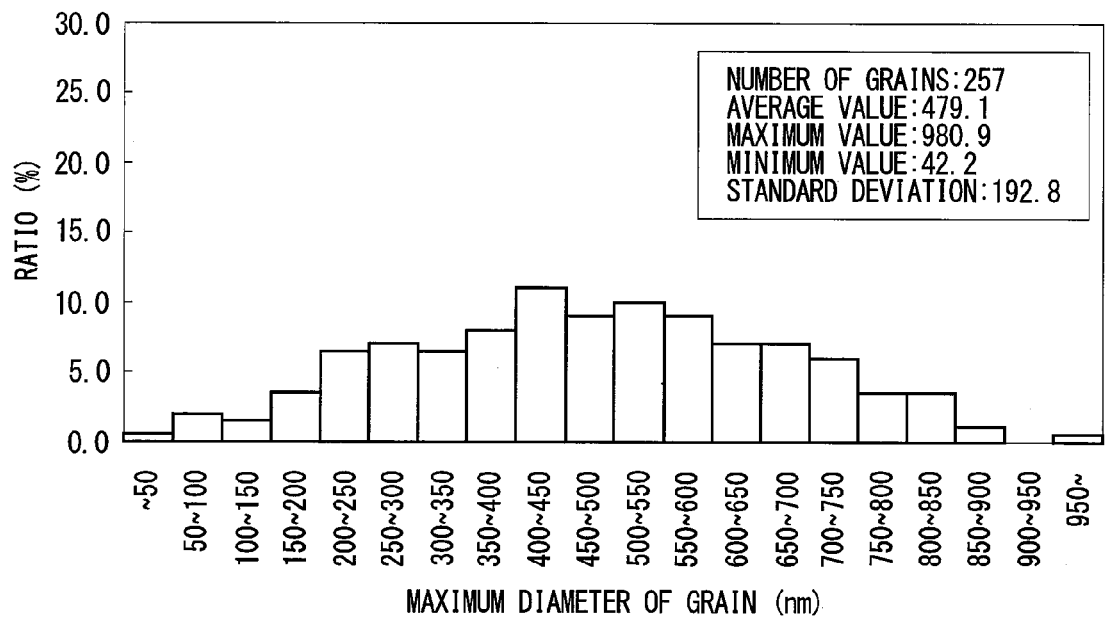
F I G. 7
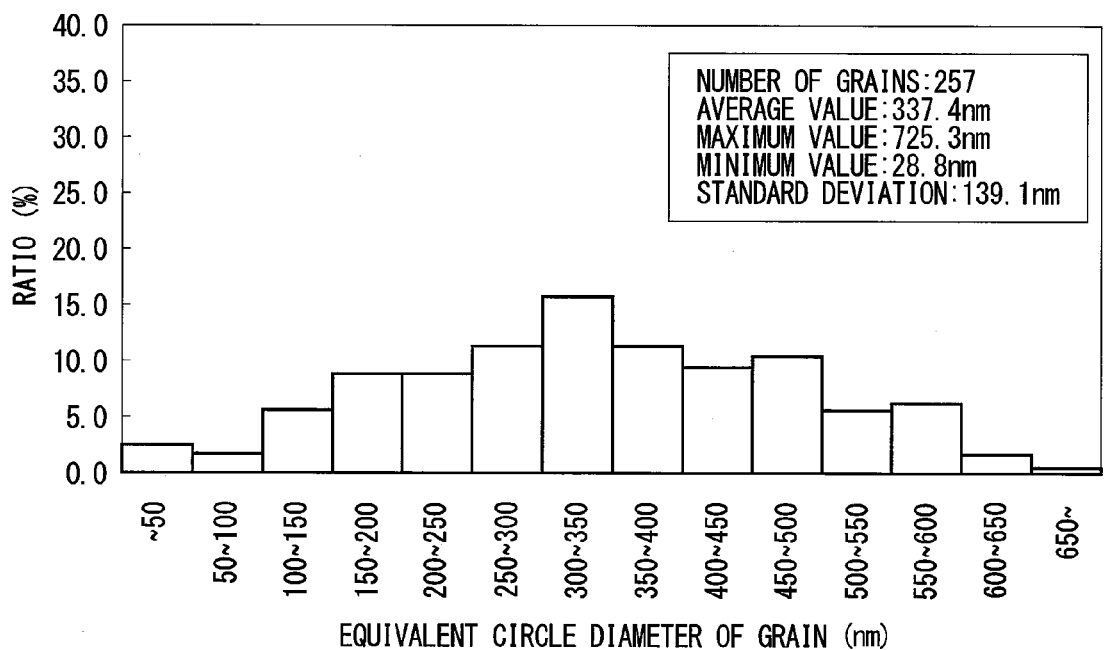
F I G. 8

TRANSPARENT CONDUCTIVE FILM

CROSS REFERENCE TO RELATED APPLICATIONS

This application claims the benefit of Japanese Patent Application No. 2012-256148, filed Nov. 22, 2012, which is hereby incorporated by reference in its entirety.

BACKGROUND

Technical Field

The present disclosure relates to a transparent conductive film applicable to an input display unit capable of inputting information by a touch of a finger, a stylus pen, or the like.

Background

In the related art, a transparent conductive film having a polycrystalline layer of indium tin oxide and a specific resistance of about $9.2\times10^{-4}$ Ω·cm is known (see Japanese Laid-Open Patent Publication No. 2010-080290). Such a transparent conductive film provides good durability against the sliding of a pen and is expected to be applied to a pen-based input touch panel.

Recently, with an increase in the size of capacitive touch panels, there is a need to further reducing a specific resistance of a transparent conductive film employed in large-sized capacitive touch panels.

SUMMARY

It is an object of the present disclosure to provide a transparent conductive film having an improved crystallinity and a reduced specific resistance.

In order to achieve the above object, according to an aspect of the disclosure, a transparent conductive film includes a film base, and a polycrystalline layer of indium tin oxide formed on the film base, the polycrystalline layer having a gradient of a concentration of tin oxide in a thickness direction thereof, a maximum value of the concentration of tin oxide in the thickness direction of the polycrystalline layer being 6 wt % to 12 wt %, the polycrystalline layer having a thickness of 10 nm to 35 nm, an average value of maximum sizes of crystal grains composing the polycrystalline layer being 380 nm to 730 nm.

Preferably, the maximum value of the concentration of tin oxide in the thickness direction of the polycrystalline layer is 6 wt % to 11 wt %.

Also preferably, a minimum value of the concentration of tin oxide in the thickness direction of the polycrystalline layer is 1 wt % to 4 wt %.

Also, the tin oxide concentration of the polycrystalline layer is higher at a center portion in the thickness direction of the polycrystalline layer and lower at both end portions in the thickness direction of the polycrystalline layer.

In the polycrystalline layer, the tin oxide concentration at a side nearer the film base is higher than the tin oxide concentration at a side farther from the film base.

More preferably, the transparent conductive film has a specific resistance of $2.0\times10^{-4}$ Ω·cm to $3.0\times10^{-4}$ Ω·cm.

According to the present disclosure, since the polycrystalline layer is formed by crystal grains having a tabular crystal habit which spreads in a planar direction and has a good crystalline continuity, the specific resistance of the transparent conductive film becomes small. Also, even if a relatively large amount of tin oxide is contained in a polycrystalline layer, since a concentration gradient of tin oxide exists in a thickness direction of the polycrystalline layer, a region having a lower tin oxide concentration promotes the crystallization of a region having a higher tin oxide concentration, an improved crystallinity is obtained. Therefore, a transparent conductive film having an improved crystallinity and a lower specific resistance can be provided.

BRIEF DESCRIPTION OF DRAWINGS

FIG. 1 is a cross sectional view schematically showing a configuration of a transparent conductive film of an embodiment of the present disclosure.

FIG. 2 is a graph showing an exemplary concentration gradient of tin oxide in a polycrystalline layer.

FIG. 3 is a graph showing other exemplary concentration gradient of tin oxide in the polycrystalline layer.

FIG. 5 is a diagram showing a binary image of the transmission electron microscope photography of FIG. 4.

FIG. 6 is a graph showing an area distribution of crystal grains in the polycrystalline layer surface.

FIG. 7 is a graph showing a maximum diameter distribution of the crystal grains in the polycrystalline layer surface.

FIG. 8 is a graph showing an equivalent circle diameter distribution of the crystal grains in the polycrystalline layer surface.

DETAILED DESCRIPTION

Figure 4:
FIG. 4 is a transmission electron microscope photography of a surface of the polycrystalline layer shown in FIG. 1.

Hereinafter, an embodiment of the present disclosure will be described in detail with reference to the accompanying drawings.

FIG. 1 is a cross sectional view schematically showing a configuration of a transparent conductive film of the present embodiment. It is to be noted that a thickness of each layer in FIG. 1 is shown by way of example, and the thickness of each layer in the transparent conductive film of the present disclosure is not limited to the thickness shown in FIG. 1.

As shown in FIG. 1, a transparent conductive film 1 of the present disclosure includes a film base 2 and a polycrystalline layer 3 of an indium tin oxide formed on the film base. The polycrystalline layer 3 has a gradient of a concentration of tin oxide in a thickness direction thereof, and a maximum value of the tin oxide concentration in the thickness direction of the polycrystalline layer 3 is 6 wt % to 12 wt %. A total thickness of the polycrystalline layer 3 is 10 nm to 35 nm, and an average value of maximum diameters of crystal grains composing the polycrystalline layer 3 is 380 nm to 730 nm.

With the transparent conductive film 1 configured as described above, since the polycrystalline layer 3 is formed with crystal grains having a tabular crystal habit spreading in a planar direction and has a good crystalline continuity, a specific resistance of the transparent conductive film is small. Also, even if a relatively large amount (6 wt % to 12 wt %) of tin oxide is contained in polycrystalline, since there is a gradient in a concentration of tin oxide in a thickness direction of the polycrystalline layer, a good crystallinity is obtained.

The transparent conductive film 1 has a specific resistance of $2.0\times10^{-4}$ Ω·cm to $3.0\times10^{-4}$ Ω·cm, and preferably $2.2\times10^{-4}$ Ω·cm to $2.8\times10^{-4}$ Ω·cm.

Hereinafter, details of each component of the transparent conductive film 1 will be described.

(1) Film Base

A film base as used herein preferably has superior transparency and heat resistance. A material forming the film base is, for example, one of polyethylene terephthalate, polycycloolefin and polycarbonate. The film base may be provided with an easy adhesive layer and a hardcoat layer on a surface thereof. The film base has a thickness of, for example, 20 μm to 200 μm.

(2) Polycrystalline Layer of Indium Tin Oxide

An indium tin oxide as used herein is a compound in which an indium oxide ($In_2O_3$) is doped with a tin oxide ($SnO_2$). When an indium oxide is doped with a tin oxide, since a part of a lattice of indium (III) is substituted by tin (IV) and an excess electron is produced, electric conductivity is developed.

In the present disclosure, the polycrystalline layer of indium tin oxide has a concentration gradient of tin oxide in a thickness direction thereof. In a first configuration having the aforementioned concentration gradient, a tin oxide concentration is higher at a center portion in the thickness direction (depth direction) of the polycrystalline layer and lower at both end portions thereof (a film base side and an outer surface side) (see FIG. 2). In a second configuration having the aforementioned concentration gradient, a tin oxide concentration at a side nearer the film base (a side in contact with the film base) is higher than the tin oxide concentration at a side farther from the film base (an outer surface side) (see FIG. 3). That is to say, the tin oxide concentration of the polycrystalline layer decreases from a surface in contact with the film base of the polycrystalline layer towards the other surface.

With such a configuration, even if a relatively large amount of tin oxide is contained in the polycrystalline layer, since crystallinity is good and crystal grains grow large, the specific resistance decrease. Further, in the first configuration, there is an effect that crystallization is achieved within a short period of time of around 60 minutes at 150° C., and in the second configuration, there is also an effect that the specific resistance becomes even smaller.

A maximum value of the tin oxide concentration in the thickness direction of the polycrystalline layer is 6 wt % to 12 wt %, and preferably 6 wt % to 11 wt %. A minimum value of the tin oxide concentration in the thickness direction of polycrystalline layer is preferably 1 wt % to 4 wt %, and more preferably 1.5 wt % to 3.5 wt %. With such a configuration, since a region having a lower tin oxide concentration promotes crystallization of a region having a higher tin oxide concentration, a good crystallinity is obtained. It is to be noted that, the tin oxide concentration in the thickness direction can be obtained by performing a depth analysis using an X-ray photoelectron spectroscopy (Electron Spectroscopy for Chemical Analysis, ESCA).

For example, by giving thermal energy, the indium tin oxide crystallizes and forms a polycrystalline layer. The polycrystalline layer has a thickness of 10 nm to 35 nm, and preferably 15 nm to 30 nm.

An average value (also referred to as a grain size) of maximum diameters of crystal grains (grains) composing the polycrystalline layer is 380 nm to 730 nm, as has been described above, and preferably 430 nm to 660 nm. As shown in FIG. 4, the maximum diameters of the crystal grains can be obtained by observing a surface of the polycrystalline layer using a transmission electron microscope (TEM).

A degree of crystallinity of the polycrystalline layer is preferably greater than or equal to 95%, and more preferably, greater than or equal to 98%. A polycrystalline layer having such a degree of crystallinity has improved stability of specific resistance and chemical resistance property. It is to be noted that the degree of crystallinity can be calculated from a ratio of areas between a crystalline region and an amorphous region, using a binary image (see FIG. 5) of the photographic image of the polycrystalline layer captured by a transmission electron microscope (TEM).

The crystal grains in the polycrystalline layer of the first configuration of the present disclosure have distributions as shown in, for example, FIGS. 6 to 8. FIG. 6 is a graph showing an area distribution of grains in the polycrystalline layer surface; FIG. 7 is a graph showing a maximum diameter distribution of the grains in the polycrystalline layer surface; and FIG. 8 is a graph showing an equivalent circle diameter distribution of the grains in the polycrystalline layer surface. In this exemplary configuration, an average value of grain areas is 104527.6 $nm^2$ (maximum value: 413204.4 $nm^2$), an average value of maximum diameters of the grains is 479.1 nm (maximum value: 980.9 nm), an average value of equivalent circle diameters of the grains is 337.4 nm (maximum value: 725.3 nm). Consequently, it can be seen that the indium tin oxide in the polycrystalline layer surface of the present disclosure exhibits good crystallization.

Hereinafter, a method of manufacturing a transparent conductive film constructed above will be described. It is to be noted that the manufacturing method is shown by way of example, and the method of manufacturing the transparent conductive film of the present disclosure is not limited to such a method.

There is a method in which, firstly, a film base is placed at a predetermined position in a sputtering apparatus, an amorphous layer of indium tin oxide is formed on the film base by a magnetron sputtering technique while applying a large horizontal magnetic field to a discharging space in sputtering, and then, in the atmosphere, heat treatment is performed on the film base on which an amorphous material of indium tin oxide is formed to convert the amorphous layer into a crystalline material.

The concentration gradient of the tin oxide in the thickness direction of the indium tin oxide can be obtained by placing a plurality of indium tin oxide target materials of different tin oxide densities in the sputtering apparatus.

The crystal grain size of a polycrystalline of indium tin oxide can be increased by the following adjustment. That is, when forming an amorphous layer of indium tin oxide, sputtering conditions are adjusted to reduce damages on the film base and the amorphous layer. As the damages on the film base and the amorphous layer are reduced, an amount of crystal nuclei serving as origins of crystal growth decreases. As the origins of the crystal growth become sparse, when crystallization is performed by heat treatment, crystals can grow largely until they encounter the neighboring crystals. Also, in a case where a thickness of the indium tin oxide layer formed as a film is small (10 nm to 35 nm), since the polycrystalline layer is formed by crystal grains having a planar crystal habit spreading in a planar direction, the crystal grains become larger and continuity of the crystals becomes good.

In the magnetron sputtering technique described above, by increasing the horizontal magnetic field on the target materials, damages on the indium tin oxide layer due to the discharging during the sputtering can be reduced. The horizontal magnetic field is preferably greater than or equal to 80 mT (millitesla), and more preferably, 100 mT to 200 mT.

Since the transparent conductive film of the present disclosure has an improved crystallinity, conditions of the heat treatment suffices with a low-temperature and a short period of time, and the heating temperature is preferably 140° C. to 170° C. and a heating time is preferably 30 mins to 60 mins.

As set forth above, according to the present embodiment, since the polycrystalline layer 3 is formed by crystal grains having a tabular crystal habit which spreads in a planar direction and has an improved crystalline continuity, a specific resistance of the transparent conductive film 1 becomes small. Also, even if a relatively large amount of tin oxide is contained in the polycrystalline, since the concentration gradient of tin oxide exists in the thickness direction of the polycrystalline layer 3, a region having a lower tin oxide concentration promotes crystallization of a region having a higher tin oxide concentration, an improved crystallinity is obtained. Therefore, a transparent conductive film having an improved crystallinity and a significantly low specific resistance can be provided.

In the above description, a transparent conductive film of the present embodiment have been described, but the present disclosure is not limited to the embodiment described above, and various alterations and modifications can be made based on a technical concept of the present disclosure.

Hereinafter, examples of the present disclosure will be described.

EXAMPLE

Example 1

An easy adhesive layer of a methylated melamine resin (manufactured by DIC corporation, product name: "Super Beckamine") having a thickness of 30 nm was formed on a surface of a polyethylene terephthalate film having a thickness of 50 µm, to prepare a film base.

Then, three types of target materials composed of an indium tin oxide having a tin oxide concentration of 3 wt %, 10 wt % and 3 wt %, respectively, were placed in a sputtering apparatus in this order. By a magnetron sputtering technique using a horizontal magnetic field of 120 mT, an amorphous layer of indium tin oxide having a total thickness of 25 nm was formed on a surface of the easy adhesive layer of the film base.

Subsequently, the film base on which the amorphous layer of indium tin oxide is formed was removed from the sputtering apparatus, and was heat-treated in a heating oven for 60 minutes at 150° C. As a result, the indium tin amorphous layer formed on the film base was completely converted into a polycrystalline layer.

Example 2

A transparent conductive film was manufactured by a method similar to Example 1 except that the target materials placed in the sputtering apparatus were replaced with two types of target materials composed of an indium tin oxide having a tin oxide concentration of 10 wt % and 3 wt %, respectively.

Comparative Example 1

A transparent conductive film was manufactured by a technique similar to Example 1 except that the horizontal magnetic field used in the magnetron sputtering technique of Example 1 was changed to 30 mT. Characteristics of the transparent conductive film of the comparative example thus-obtained are shown in Table 1.

Comparative Example 2

A transparent conductive film was manufactured by a technique similar to Example 2 except that the horizontal magnetic field in the magnetron sputtering technique of Example 2 was changed to 30 mT. Characteristics of the transparent conductive film of a comparative example thus-obtained are shown in Table 1.

Then, the transparent conductive films of Examples 1 and 2 and Comparative Examples 1 and 2 manufactured in a manner described as above were measured and evaluated in accordance with the following methods.

(1) Horizontal Magnetic Field

Using a teslameter (manufactured by KANETEC CO., LTD., TM-701), a horizontal magnetic field on a target material was measured in conformity with JIS C2501.

(2) Thickness of Polycrystalline Layer

A thickness of a polycrystalline layer was measured by cross-sectional observation using a transmission electron microscope (manufactured by Hitachi, Ltd., H-7650). A thickness of the film base was measured using a film thickness meter (manufactured by Ozaki MFG. Co., Ltd., "Peacock" digital dial gauge DG-205).

(3) Specific Resistance

A surface resistance value was measured using a four terminal method in conformity with JIS K7194, and the surface resistance value was multiplied by a film thickness (cm converted) to obtain a value representing a specific resistance.

(4) Average Value of Maximum Diameters of Crystal Grains

A crystalline material layer was cut using an ultramicrotome, and an image was captured using a transmission electron microscope (manufactured by Hitachi, Ltd., H-7650) with a direct magnification being set such that a sufficient number of crystal grains can be observed (3,000× magnification in Examples and 6,000× magnification in Comparative Examples). The image was subjected to an image analysis process, and a longest diameter of a shape of each grain boundary was calculated as a maximum diameter (nm) and an average value of the maximum diameters was determined.

(5) Depth Analysis by the X-Ray Photoelectron Spectroscopy

A specimen of 5 mm square was prepared and a wide scan was performed using an X-ray photoelectron spectroscopy (manufactured by ULVAC-PHI, Inc, Quantum 2000) and a qualitative analysis was performed. Thereafter, a depth direction analysis by Ar ion sputtering was performed on detected elements and N, and a content of tin oxide was calculated.

Table 1 shows results of measurements and evaluations of the transparent conductive films of Examples 1 and 2 and Comparative Examples 1 and 2 performed by the aforementioned methods (1) to (5). The results of the depth analysis by the X-ray photoelectron spectroscopy on the transparent conductive films of Examples 1 and 2 are as shown in FIGS. 2 and 3.

TABLE 1

| | HORIZONTAL MAGNETIC FIELD (mT) | THICKNESS OF POLYCRYSTALLINE LAYER (nm) | AVERAGE VALUE OF MAXIMUM DIAMETERS OF CRYSTAL GRAINS (nm) | SPECIFIC RESISTANCE ($\Omega \cdot cm$) |
|---|---|---|---|---|
| EXAMPLE 1 | 120 | 25 | 480 | $2.7 \times 10^{-4}$ |
| EXAMPLE 2 | 120 | 25 | 606 | $2.3 \times 10^{-4}$ |
| COMPARATIVE EXAMPLE 1 | 30 | 25 | 250 | $3.8 \times 10^{-4}$ |
| COMPARATIVE EXAMPLE 2 | 30 | 25 | 230 | $3.3 \times 10^{-4}$ |

As can be seen in Example 1 of Table 1, when the average value of the maximum diameters of the crystal grains was 480 nm, the specific-resistance of the transparent conductive film was as small as $2.7 \times 10^{-4}$ $\Omega \cdot cm$. Assuming that an outer surface of the polycrystalline layer (a surface on a side opposite to a surface which is in contact with the film base) has a depth of 0 (nm), a maximum value of the tin oxide concentration in the thickness direction of the polycrystalline layer was 6.6 wt % (depth: approximately 10 nm) and a minimum value of the tin oxide concentration was 2.2 wt % (depth: approximately 3.0 nm).

Also, as shown in Example 2, when the average value of the maximum diameters of the crystal grains was 606 nm, the specific-resistance of the transparent conductive film was as small as $2.3 \times 10^{-4}$ $\Omega \cdot cm$. A maximum value of the tin oxide concentration in the thickness direction of the polycrystalline layer was 6.6 wt % (depth: approximately 11 nm) and a minimum value of the tin oxide concentration was 3.3 wt % (depth: approximately 2.0 nm).

On the other hand, as shown in Comparative Example 1, when the average value of the maximum diameters of the crystal grains was 250 nm, the value of the specific resistance of the transparent conductive film was $3.8 \times 10^{-4}$ $\Omega \cdot cm$, which is greater than the cases of Examples 1 and 2.

Also, as shown in Comparative Example 2, when the average value of the maximum diameter of the crystal grains was 230 nm, a value of the specific resistance of the transparent conductive film was $3.3 \times 10^{-4}$ $\Omega \cdot cm$, which is greater than the cases of Examples 1 and 2.

Therefore, it was found that, by setting the horizontal magnetic field in the magnetron sputtering technique at 120 mT and forming an amorphous layer of the indium tin oxide having a concentration gradient of tin oxide and a total thickness of 25 nm, the average value of the maximum diameters of the crystal grains was 480 nm to 606 nm and the value of the specific resistance was $2.3 \times 10^{-4}$ $\Omega \cdot cm$ to $2.7 \times 10^{-4}$ $\Omega \cdot cm$, and thus a transparent conductive film having a reduced specific resistance can be manufactured.

INDUSTRIAL APPLICABILITY

There is no particular restriction to the use of the transparent conductive film concerning the present disclosure, and it is preferably a capacitive sensing touch panel which is preferably used for portable terminals such as smartphones or tablet terminals (also referred to as Slate PCs).

What is claimed is:

1. A transparent conductive film comprising:
   a film base; and
   a polycrystalline layer of indium tin oxide formed on the film base,
   the polycrystalline layer as a whole being formed by crystal grains,
   the polycrystalline layer having a gradient of a concentration of tin oxide in a thickness direction thereof,
   a maximum value of the concentration of tin oxide in the thickness direction of the polycrystalline layer being 6 wt % to 12 wt %,
   the polycrystalline layer having a thickness of 10 nm to 35 nm,
   an average value of maximum sizes of the crystal grains composing the polycrystalline layer being 380 nm to 730 nm.

2. The transparent conductive film according to claim 1, wherein the maximum value of the concentration of tin oxide in the thickness direction of the polycrystalline layer is 6 wt % to 11 wt %.

3. The transparent conductive film according to claim 1, wherein a minimum value of the concentration of tin oxide in the thickness direction of the polycrystalline layer is 1 wt % to 4 wt %.

4. The transparent conductive film according to claim 1, wherein the tin oxide concentration of the polycrystalline layer is higher at a center portion in the thickness direction of the polycrystalline layer and lower at both end portions in the thickness direction of the polycrystalline layer.

5. The transparent conductive film according to claim 1, wherein, in the polycrystalline layer, the tin oxide concentration at a side nearer the film base is higher than the tin oxide concentration at a side farther from the film base.

6. The transparent conductive film according to claim 1, wherein the transparent conductive film has a specific resistance of $2.0 \times 10^{-4}$ $\Omega \cdot cm$ to $3.0 \times 10^{-4}$ $\Omega \cdot cm$.

* * * * *